United States Patent
Bennani et al.

(10) Patent No.: US 11,537,374 B1
(45) Date of Patent: Dec. 27, 2022

(54) SYSTEM AND METHOD FOR HOT METHOD CALL GRAPH ANALYSIS

(71) Applicant: ORACLE INTERNATIONAL CORPORATION, Redwood Shores, CA (US)

(72) Inventors: Mohamed Noureddine Bennani, Portland, OR (US); Nathan Reynolds, Rexburg, ID (US); Brian Maulding, Fremont, CA (US)

(73) Assignee: ORACLE INTERNATIONAL CORPORATION, Redwood Shores, CA (US)

( * ) Notice: Subject to any disclaimer, the term of this patent is extended or adjusted under 35 U.S.C. 154(b) by 0 days.

(21) Appl. No.: 17/338,188

(22) Filed: Jun. 3, 2021

(51) Int. Cl.
*G06F 8/41* (2018.01)
*H04L 67/10* (2022.01)

(52) U.S. Cl.
CPC ............ *G06F 8/4441* (2013.01); *H04L 67/10* (2013.01)

(58) Field of Classification Search
CPC .... G06F 16/9027; G06F 8/433; G06F 8/4441; H04L 67/10
See application file for complete search history.

(56) References Cited

U.S. PATENT DOCUMENTS

| | | | |
|---|---|---|---|
| 7,340,732 B2 | 3/2008 | Gu | |
| 7,640,457 B2 | 12/2009 | Erwin | |
| 8,135,995 B2 | 3/2012 | Ngai | |
| 9,614,745 B2 | 4/2017 | Mathur | |
| 10,304,006 B2 | 5/2019 | Keshava | |
| 10,585,788 B2 | 3/2020 | Nallabothula | |
| 11,119,894 B2 | 9/2021 | Bhosale | |

(Continued)

FOREIGN PATENT DOCUMENTS

| | | |
|---|---|---|
| EP | 1480128 | 4/2006 |
| EP | 1746508 | 1/2007 |
| WO | 2014150298 | 9/2014 |

OTHER PUBLICATIONS

Ibidunmoye, Olumuyiwa, "Performance Problem Diagnosis in Cloud Infrastructures", Licentiate Thesis, May 2016, Department of Computing Science, Umea, Sweden, Copyright © 2016, 38 pages, <https://www.diva-portal.org/smash/get/diva2:928037/FULLTEXT02.pdf>.

(Continued)

*Primary Examiner* — Wei Y Zhen
*Assistant Examiner* — Amir Soltanzadeh
(74) *Attorney, Agent, or Firm* — Tucker Ellis LLP (57) ABSTRACT

Systems and methods for hot method call graph analysis. An exemplary method can provide a hot method call graph analyzer. The method can receive a generated call graph, the generated call graph comprising a plurality of branches. The method can automatically traverse each branch of the generated call graph. For each traversed branch, the method can generate and store a list of leaf methods of each branch along with a corresponding execution time and number of samples of each leaf method, resulting in plurality of leaf method lists. The method can combine each of the plurality lists of leaf methods in an overall list of leaf methods of the generated call graph, resulting in a complete list of leaf methods of the generated call graph, which can be provided via, for example, a user interface. The systems and method described can additionally perform similar analysis for non-leaf methods.

18 Claims, 6 Drawing Sheets

(56) References Cited

U.S. PATENT DOCUMENTS

| | | |
|---|---|---|
| 2004/0249914 A1 | 12/2004 | Flocken |
| 2007/0022320 A1 | 1/2007 | Flocken |
| 2008/0109683 A1 | 5/2008 | Erwin |
| 2009/0106601 A1 | 4/2009 | Ngai |
| 2014/0025607 A1* | 1/2014 | Wang ................. G06F 16/9027 706/12 |
| 2014/0236872 A1 | 8/2014 | Keshava |
| 2014/0278812 A1 | 9/2014 | Reinhold |
| 2015/0195182 A1 | 7/2015 | Mathur |
| 2016/0085527 A1* | 3/2016 | de Lima Ottoni .. G06F 16/9024 717/157 |
| 2018/0239694 A1 | 8/2018 | Nallabothula |
| 2020/0012521 A1* | 1/2020 | Wu ....................... G06F 9/5038 |
| 2020/0065217 A1 | 2/2020 | Bhosale |
| 2020/0210161 A1* | 7/2020 | Portela Parente .. G06F 16/9024 |
| 2020/0272444 A1* | 8/2020 | Nilsen .................. G06F 8/4441 |
| 2021/0133017 A1* | 5/2021 | Cheng .................... G06N 20/00 |
| 2022/0044131 A1* | 2/2022 | Rayes ...................... G06N 5/04 |

OTHER PUBLICATIONS

Ismail, Ahmed et al., "Healthcare Analysis in Smart Big Data Analytics: Review, Challenges and Recommendations", Information Systems Department, Faculty of Computers and Information, Mansoura University, Mansoura, Egypt, © Springer Nature Switzerland AG 2019, 19 pages, <https://link.springer.com/chapter/10.1007/978-3-030-01560-2_2>.

* cited by examiner

SYSTEM AND METHOD FOR HOT METHOD CALL GRAPH ANALYSIS

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

TECHNICAL FIELD

Embodiments of the invention are generally related to computer implemented software, and in particular systems and methods for hot method call graph analysis.

BACKGROUND

One of the main objectives for many computer programmers is to improve the performance of a computer program, such as shortening its execution time, while optimizing its CPU and memory usage at the same time. Over time, various tools have been developed to assist in the analysis and optimization of software programs. A program profiler is an example of such tools. A program profiling tool, typically, comprises a hot method call graph, which can also be referred to as a call graph, or a control-flow graph. Hot method call graphs can provide a representation of calling relationships between subroutines in a computer program. Such graphs can provide representations of parts (e.g., routines, subroutines) of an application that were most active during the profile. These could be the parts that, for example, consumed more memory, took more CPU time, or both.

Software performance optimization is an important part of software development life cycle good practice. Software engineers need to make sure that the delivered software meets end users' expectations for response times, system throughput, scalability, etc. In the age of cloud computing where users are often billed per usage time of their cloud provider resources, software optimizations result in costs savings too. In their quest for software optimization, software engineers typically resort to capturing an application's runtime profiles that they need to analyze in order to find out the different hot methods that consume CPU cycles. Once the hot methods have been reliably identified, the engineers need to diligently analyze corresponding call graphs in order to locate the underlying causes that would be considered for optimizations.

The analysis of the different call graphs is a laborious, manual, and visual effort that is very error-prone. The depth and breadth of call graphs are factors that can make the analysis process extremely complicated. Software developers and engineers need to keep track, on their own, of the costly method calls encountered in each branch in the call graphs of the hot methods being investigated. Furthermore, in the absence of an automated call graph analysis report, the time consuming and error-prone manual/visual analysis needs to be repeated over and over each time the developers need to evaluate the impact of an optimization in the code of the hot method being investigated.

SUMMARY

In accordance with an embodiment, systems and methods for hot method call graph analysis are provided. An exemplary method can provide a computer including one or more microprocessors. The method can provide a hot method call graph analyzer at the computer. The method can receive a generated call graph, the generated call graph comprising a plurality of branches. The method can automatically traverse each branch of the generated call graph. For each traversed branch, the method can generate and store a list of leaf methods of each branch along with a corresponding execution time and/or number of samples of each leaf method, resulting in plurality of leaf method lists. The method can combine each of the plurality lists of leaf methods in an overall list of leaf methods of the generated call graph, resulting in a complete list of leaf methods of the generated call graph, which can be provided via, for example, a user interface. The systems and methods described can additionally perform similar analysis for non-leaf methods and can combine the lists for leaf methods and non-leaf methods for analysis.

DETAILED DESCRIPTION

In the following description, the invention will be illustrated by way of example and not by way of limitation in the figures of the accompanying drawings. References to various embodiments in this disclosure are not necessarily to the same embodiment, and such references mean at least one. While specific implementations are discussed, it is understood that this is provided for illustrative purposes only. A person skilled in the relevant art will recognize that other components and configurations may be used without departing from the scope and spirit of the invention.

Furthermore, in certain instances, numerous specific details will be set forth to provide a thorough description of the invention. However, it will be apparent to those skilled in the art that the invention may be practiced without these specific details. In other instances, well-known features have not been described in as much detail so as not to obscure the invention.

The present invention is described with the aid of functional building blocks illustrating the performance of specified functions and relationships thereof. The boundaries of these functional building blocks have often been arbitrarily defined herein for the convenience of the description. Thus, functions shown to be performed by the same elements may in alternative embodiments be performed by different elements. And functions shown to be performed in separate elements may instead be combined into one element. Alternate boundaries can be defined so long as the specified functions and relationships thereof are appropriately performed. Any such alternate boundaries are thus within the scope and spirit of the invention.

As described above, cloud infrastructure environments can comprise sets of complementary cloud services that enable users and clients to build and run a wide range of applications and services in a highly available hosted environment.

Figure 1:
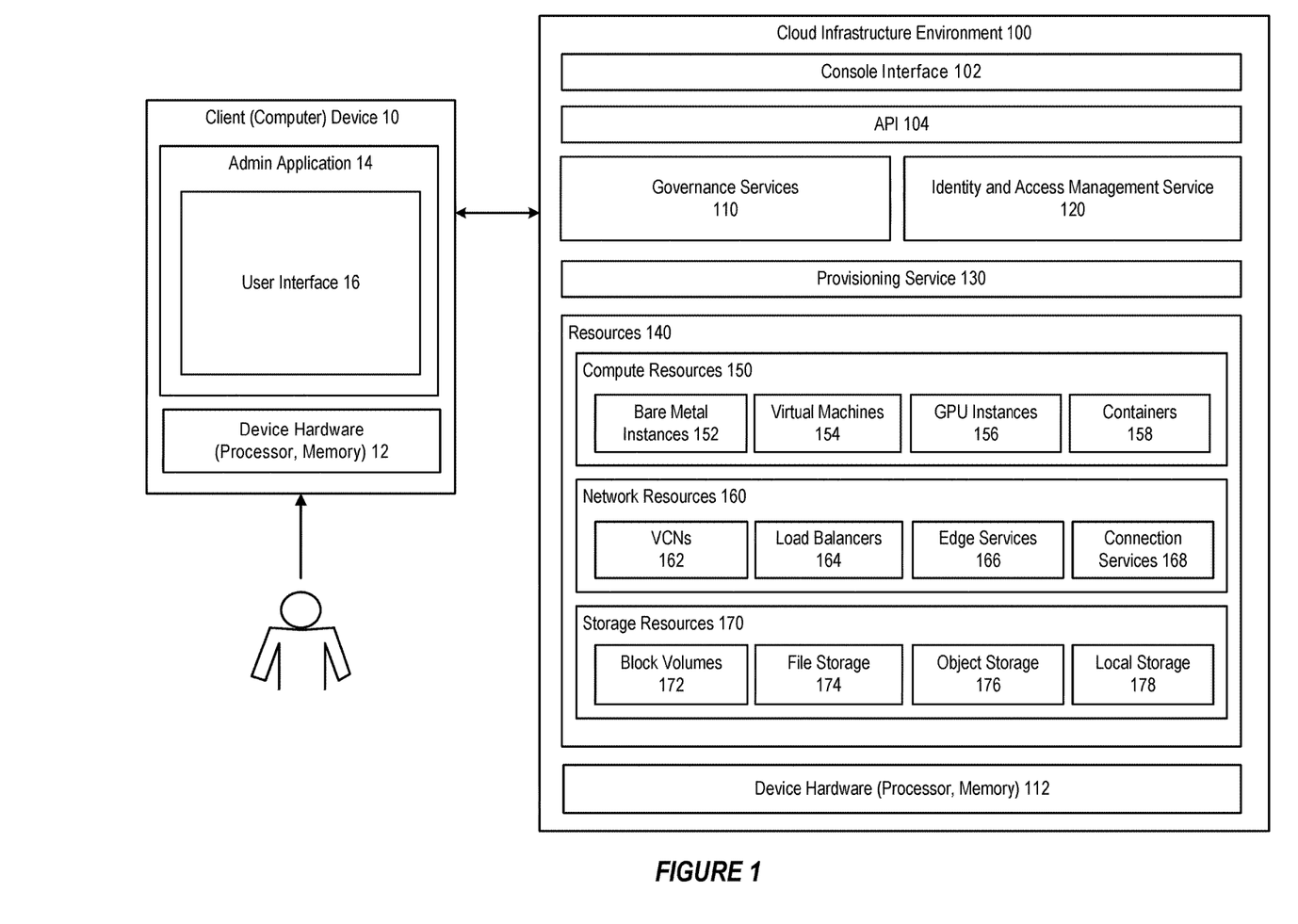
FIG. 1 shows a system for providing a cloud infrastructure environment, in accordance with an embodiment.

FIG. 1 shows a system for providing a cloud infrastructure environment, in accordance with an embodiment.

In accordance with an embodiment, a cloud infrastructure environment 100, which can be run on a number of hardware and software resources 112, can comprise a console interface 102 and an API 104. In addition, the cloud infrastructure environment 100 can support a number of governance services 110, an identity and access management (IAM) service 120, and a provisioning service 130. The cloud infrastructure environment 100 can also support a number of resources 140, e.g., in layers, such as a computer resource layer 150, a network resource layer 160, and a storage resource layer 170.

In accordance with an embodiment, a client device, such as a computing device 10 having device hardware (processor, memory . . . etc.) 12, can communicate with the cloud infrastructure environment via a network, such as a wide area network (WAN), a local area network (LAN), or the internet, for example. The client device can comprise an administrator application 14, which can comprise a user interface 16.

In accordance with an embodiment, within the cloud infrastructure environment, tenancy can be supported. On registration and deployment, a tenancy can be created for each client/customer, which can comprise a secure and isolated partition within the cloud infrastructure in which the client can create, organize, and administer their cloud resources.

In accordance with an embodiment, the console interface 102 and the API 104 can provide clients with access to, and control over respective portions of the could infrastructure environment. In accordance with an embodiment, the console interface can comprise an intuitive, graphical interface that lets clients create and manage resources, instances, cloud networks, and storage volumes, as well as manage users associated with the client, and set permissions within the client scope. As well, the API 104 can compromise, for example, a REST API that utilizes HTTPS (hypertext transfer protocol secure).

In accordance with an embodiment, one example of a console interface or API can be a configuration management tool (e.g., Ansible). The configuration management tool can be used for cloud infrastructure provisioning, orchestration, and configuration management. Configuration management tools can allow clients to automate configuring and provisioning of the cloud infrastructure, deploying and updating software assets, and orchestrating complex operational processes.

In accordance with an embodiment, the governance services 110 of the cloud infrastructure environment provides clients tools to help clients enable simple resource governance, manage costs, and control access to the cloud infrastructure. As an example, the governance services provide for tagging which can allow for clients to apply tags to their resources for informational or operational reasons. Defined tags can be controlled to avoid incorrect tags from being applied to resources. Tags can also provide a flexible targeting mechanism for administrative scripts. As well, the governance services can allow for managed budgets, and track actual and forecasted spend all from one place. This allows clients to stay on top of usage with a cost analysis dashboard, and filter by compartments and tags to analyze spending by departments, teams, and projects. Such data can as well be exported for detailed resource utilization reporting and integration with an existing cloud management and business intelligence tools. The governance services can also log events that can later be retrieved, stored, and analyzed for security, compliance, and resource optimization across the cloud infrastructure entitlements and compartments.

In accordance with an embodiment, the identity and access management service 120 can create a user profile for each client/customer/user in the IAM service with associated user credential (e.g., username and password). Clients can be granted administrator privileges in the cloud infrastructure as well via the IAM service.

In accordance with an embodiment, the identity and access management service can be integrated with the cloud infrastructure environment. Upon a client registering, the IAM service can create a separate user credential in an identity service, which can then allow for single sign on to the cloud infrastructure service as well as access to additional cloud services.

In accordance with an embodiment, the provisioning service 130 can provision, for example, a tenancy within cloud infrastructure service, such as within the resources 140. The provisioning service can be accessed and controlled through, for example, the console interface or via one or more APIs, such as REST API 104. The provisioning service can allow clients to provision and manage compute hosts, which can be referred to as instances. Clients can launch instances as needed to meet compute and application requirements. After a client launches an instance, the provisioned instance can be accessed from, for example, a client device. The provisioning service can also provide for restarting an instance, attaching and detaching volumes from an instance, and terminating an instance.

In accordance with an embodiment, resources 140 provided by a cloud infrastructure environment can be broken down into a plurality of layers, such as a compute resources layer 150, a network resources layer 160, and a storage resource layer 170.

In accordance with an embodiment, the compute resources layer 150 can comprise a number of resources, such as, for example, bare metal instances 152, virtual machines 154, edge services 156, and containers 158. The compute resources layer can be used to, for example, provision and manage bare metal compute instances, provision instances as needed to deploy and run applications, just as in an on-premises data center.

In accordance with an embodiment, the cloud infrastructure environment can provide control of one or more physical host ("bare metal") machines within the compute resources layer. Bare metal compute instances run directly on bare metal servers without a hypervisor. When a bare metal compute instance is provisioned, the client can maintain sole control of the physical CPU, memory, and network interface card (NIC). The bare metal compute instance can be configured and utilize the full capabilities of each physical machine as if it were hardware running in an on-premise data center. As such, bare metal compute instances are generally not shared between tenants.

In accordance with an embodiment, bare metal compute instances can provide, via the associated physical hardware as opposed to a software-based virtual environment, a high level of security and performance.

In accordance with an embodiment, the cloud infrastructure environment can provide control of a number of virtual machines within the compute resources layer. A virtual machine compute host can be launched, for example, from an image that can determine the virtual machines operating system as well as other software. The types and quantities of resources available to a virtual machine instance can be determined, for example, based upon the image that the virtual machine was launched from.

In accordance with an embodiment, a virtual machine (VM) compute instance can comprise an independent computing environment that runs on top of physical bare metal hardware. The virtualization makes it possible to run multiple VMs that are isolated from each other. VMs can be used, for example, for running applications that do not require the performance and resources (CPU, memory, network bandwidth, storage) of an entire physical machine.

In some embodiments, virtual machine instances can run on the same hardware as a bare metal instance, which can provide leverage over using the same cloud-optimized hardware, firmware, software stack, and networking infrastructure In accordance with an embodiment, the cloud infrastructure environment can provide a number of graphical processing unit (GPU) compute instances within the compute resources layer. Accelerated computing requires consistently-fast infrastructure across every service. With GPU instances, clients can process and analyze massive data sets more efficiently, making them useful for complex machine learning (ML), artificial intelligence (AI) algorithms, and many industrial HPC applications. GPU compute instances can be provisioned as either virtualized compute instances (where multiple GPU compute instances share the same bare metal hardware), or as bare metal instances which provide dedicated hardware for each GPU compute instance.

In accordance with an embodiment, the cloud infrastructure environment can provide a number of containerized compute instances within the compute resources layer. A standalone container engine service can be used to build and launch containerized applications to the cloud. The container service can be used, for example, to build, deploy, and manage cloud-native applications. The container service can specify the compute resources that the containerized applications require, and the container engine can then provision, via the provisioning service, the required compute resources for use within the cloud infrastructure environment (e.g., in the context of a tenancy).

In accordance with an embodiment, one such container service engine that can be used is Kubernetes, an open-source system for automating deployment, scaling, and management of containerized applications across clusters of hosts. Such container services can group the containers that make up an application into logical units for easy management and discovery.

In accordance with an embodiment, the network resources layer 160 can comprise a number of resources, such as, for example, virtual cloud networks (VCNs) 162, load balancers 164, edge services 166, and connection services 168.

In accordance with an embodiment, the cloud infrastructure environment can provide a number of virtual cloud networks 162 at the networking resources layer. A virtual cloud network can comprise a virtual version of a traditional network—including subnets, route tables, and gateways—on which client instances can run. A cloud network resides within a single region but includes all the region's availability domains. Each subnet defined in the cloud network can either be in a single availability domain or span all the availability domains in the region (recommended). At least one cloud network can be configured before launching instances. In certain embodiments, VCNs can be configured via an internet gateway to handle public traffic, a VPN connection, or a fast connect service to securely extend on-premises network.

In accordance with an embodiment, the cloud infrastructure environment can provide a number of load balancers 164 at the networking resources layer. A load balancing service can provide automated traffic distribution from one entry point to multiple servers reachable from a virtual cloud network (VCN). Various load balancers can provide a public or private IP address, and provisioned bandwidth.

In accordance with an embodiment, a load balancer can improve resource utilization, scaling, and help ensure high availability. Multiple load balancing policies can be configured, and application-specific health checks can be provided to ensure that the load balancer directs traffic only to healthy instances. The load balancer can reduce maintenance window by draining traffic from an unhealthy application server before it is removed from service for maintenance.

In accordance with an embodiment, a load balancing service enables creation of a public or private load balancer in conjunction with a VCN. A public load balancer has a public IP address that is accessible from the internet. A private load balancer has an IP address from the hosting subnet, which is visible only within the VCN. Multiple listeners can be configured for an IP address to load balance for different layers of traffic (e.g., Layer 4 and Layer 7 (TCP and HTTP) traffic). Both public and private load balancers can route data traffic to any backend server that is reachable from the VCN.

In accordance with an embodiment, a public load balancer can accept traffic from the internet, a public load balancer can be created that is assigned a public address, which serves as the entry point for incoming traffic.

In accordance with an embodiment, a public load balancer is regional in scope. If a region includes multiple availability domains, a public load balancer can have, for example, a regional subnet, or two availability domain-specific (AD-specific) subnets, each in a separate availability domain. With a regional subnet, the load balancer can create a primary load balancer and a standby load balancer, each in a different availability domain, to ensure accessibility even during an availability domain outage. If a load balancer is created in multiple AD-specific subnets, one subnet can host the primary load balancer and the other hosts a standby load balancer. If the primary load balancer fails, the public IP address can switch to the secondary load balancer. The service treats the two load balancers as equivalent.

In accordance with an embodiment, if a region includes only one availability domain, the service requires just one subnet, either regional or AD-specific, to host both the primary and standby load balancers. The primary and standby load balancers can each have a private IP address from the host subnet, in addition to the assigned floating public IP address. If there is an availability domain outage, the load balancer has no failover.

In accordance with an embodiment, private load balancers can also be provided so as to isolate the load balancer from the internet and simplify security posture. The load balancer service can assign a private address to the load balancer that serves as the entry point for incoming traffic.

In accordance with an embodiment, a private load balancer can be created by a service to service only one subnet and to host both the primary and standby load balancers. The load balancer can be regional or AD-specific, depending on the scope of the host subnet. The load balancer is accessible only from within the VCN that contains the host subnet, or as further restricted by security rules.

In accordance with an embodiment, the assigned floating private IP address is local to the host subnet. The primary and standby load balancers each require an extra private IP address from the host subnet.

In accordance with an embodiment, if there is an availability domain outage, a private load balancer created in a regional subnet within a multi-AD region provides failover capability. A private load balancer created in an AD-specific subnet, or in a regional subnet within a single availability domain region, has no failover capability in response to an availability domain outage.

In accordance with an embodiment, the cloud infrastructure environment can provide a number of edge services 166 at the networking resources layer. In general, edge services comprise a number of services that allow clients to manage, secure, and maintain domains and endpoints. These include, for example, DNS (domain name system), DDoS (distributed denial of service) protection, and email delivery. These services enable clients to optimize performance, thwart cyberattacks, and scale communication.

In accordance with an embodiment, the cloud infrastructure environment can provide a number of connection services 168 at the networking resources layer. Such connection services can provide an easy way to create a dedicated, private connection between a client data center or existing network and the cloud infrastructure environment. The connection service can provide high bandwidth, and a reliable and consistent network.

In accordance with an embodiment, the storage resources layer 170 can comprise a number of resources, such as, for example, block volumes 172, file storage 174, object storage 176, and local storage 178.

In accordance with an embodiment, block volumes 172 provide high-performance network storage capacity that supports a broad range of I/O intensive workloads. Clients can use block volumes to expand the storage capacity of compute instances, to provide durable and persistent data storage that can be migrated across compute instances, and to host large databases.

In accordance with an embodiment, file storage 174 allows clients to create a scalable, distributed, enterprise-grade network file system. File storage supports semantics, snapshots capabilities, and data at-rest encryption.

In accordance with an embodiment, object storage provides high throughput storage for unstructured data. Object storage service enables near limitless storage capacity for large amounts of analytic data, or rich content like images and videos. Block volumes can be backed up to object storage for added durability.

In accordance with an embodiment, local storage 178 can provide, for example, high speed and reliable storage in the form of solid-state drives for I/O intensive applications. These can be provided, for example, within bare metal instances. Local storage provides high storage performance for VM's and bare metal compute instances. Some examples include relational databases, data warehousing, big data, analytics, AI and HPC application.

Hot Method Call Graph Analysis

Software performance optimization is an important part of software development life cycle good practice. Software engineers need to make sure that the delivered software meets end users' expectations for response times, system throughput, scalability, etc. In the age of cloud computing where users are often billed per usage time of their cloud provider resources, software optimizations result in costs savings too. In their quest for software optimization, software engineers typically resort to capturing an application's runtime profiles that they need to analyze in order to find out the different hot methods that consume CPU cycles. Once the hot methods have been reliably identified, the engineers need to diligently analyze corresponding call graphs in order to locate the underlying causes that would be considered for optimizations.

The analysis of the different call graphs is a laborious, manual, and visual effort that is very error-prone. The depth and breadth of call graphs are factors that can make the analysis process extremely complicated. Software developers and engineers need to keep track, on their own, of the costly method calls encountered in each branch in the call graphs of the hot methods being investigated. Furthermore, in the absence of an automated call graph analysis report, the time consuming and error-prone manual/visual analysis needs to be repeated over and over each time the developers need to evaluate the impact of an optimization in the code of the hot method being investigated.

In accordance with an embodiment, described herein are systems and methods that address the inherent challenges presented in analyzing call graphs. These systems and methods provide for an automated hot method call graph analysis that provides benefits to both software engineers, developers, and software profiler tools.

In accordance with an embodiment, it is difficult to find underlying causes of hot methods in applications. The typical practice of finding an application's hot methods that could be considered for optimizations, consists of taking a runtime profile of the application code using some profiling tools. The developers would then visually examine, in the profiler console or GUI/UI, the call graphs of the hot methods. The call graphs need to be traversed both in-depth and in-breadth in order to get comprehensive views of the different expensive method calls. The developers need to keep track, on their own, of the costly method calls encountered in each branch in the call graphs of the hot method being investigated. Given that the number of branches and their depth in the call graph can be extremely large for some hot methods, the visual/manual analysis of the call graphs becomes quite overwhelming and very much error prone. Developers will either spend a lot of time analyzing the call graphs or stop early and miss crucial information. Furthermore, in the absence of an automated call graph analysis report, the time consuming and error-prone manual/visual analysis needs to be repeated over and over each time the developers need to evaluate the impact of an optimization in the code of the hot method being investigated.

In accordance with an embodiment, the presently disclosed systems and methods can provide hot methods call graph analysis. The presented approach comprises automating the analysis of call graphs and automatically generating the corresponding analysis reports regardless of the number and depth of the branches of the call graph.

In accordance with an embodiment, a system and method can be provided with a generated call graph comprising a plurality of branches, a plurality of non-leaf methods, and a plurality of leaf methods. Each leaf method within the generated call graph represents a method in a branch that does not call any other method. The generated call graph can comprise a representation of a hot method and can provide a corresponding execution time and/or number of samples. Based on the generated call graph provided to the systems and methods, the systems and methods can automatically perform the analysis and generate a final report.

In accordance with an embodiment, the systems and methods can traverse each branch in the call graph.

In accordance with an embodiment, the systems and methods can, for each traversed branch in the call graph, maintain/generate a list of all the leaf and non-leaf methods called along with their corresponding exclusive execution times and/or number of samples. The leaf methods are methods in the branches of the call graphs and which do not call any other methods. The list of leaf hot methods for each traversed branch is sorted descending order of execution time and/or number of samples.

In accordance with an embodiment, such list along with the corresponding execution times and/or number of samples can be stored in an accessible memory.

In accordance with an embodiment, the systems and methods can merge all the obtained leaf hot methods lists into one single overall list of unique leaf hot methods along with their execution times and/or number of samples.

In accordance with an embodiment, the systems and methods can, for each traversed branch in the call graph, maintain/generate a list of all the non-leaf methods called along with their corresponding exclusive execution times and/or number of samples. The non-leaf methods are methods in the branches of the call graphs which do call other methods. Their exclusive execution times and/or samples can be obtained by subtracting the times and/or number of samples in their descendant methods they call from those of their own. The list of non-leaf hot methods for each traversed branch is sorted descending order of execution time and/or number of samples.

In accordance with an embodiment, the systems and methods can merge all the obtained non-leaf hot methods lists into one single overall list of unique non-leaf hot methods along with their execution times and/or number of samples.

In accordance with an embodiment, the systems and methods can merge both the overall leaf hot methods list and the overall non-leaf hot methods list into one single "Hot Descendants" list of unique hot methods along with their execution times and/or number of samples. The "Hot Descendants" list (the merged list of overall leaf hot methods and overall non-leaf hot methods) provides a complete summary of the analysis of the call graph for the hot method of interest. The "Hot Descendants" list readily gives the breakdown of execution times and/or number of samples in the different methods called by the hot method of interest.

In accordance with an embodiment, the systems and methods can sort the list by descending order of total execution times and/or number of samples.

In accordance with an embodiment, the systems and methods can, in case of a tie, sort on order of importance for types of methods/packages and then alphabetically.

In accordance with an embodiment, the systems and methods can generate the final "Hot Descendants" list and store it in a durable system (e.g., file on disk), which can be accessible. The software developers can access the "Hot Descendants" list via an interface, e.g., a graphical user interface, or console, and/or via normal file access. Such a list can be beneficial to developers in looking at the top methods in the "Hot Descendants" report for identifying the methods that need to be optimized to reduce the overall execution time and/or number of samples consumed by the hot method of interest.

Figure 2:
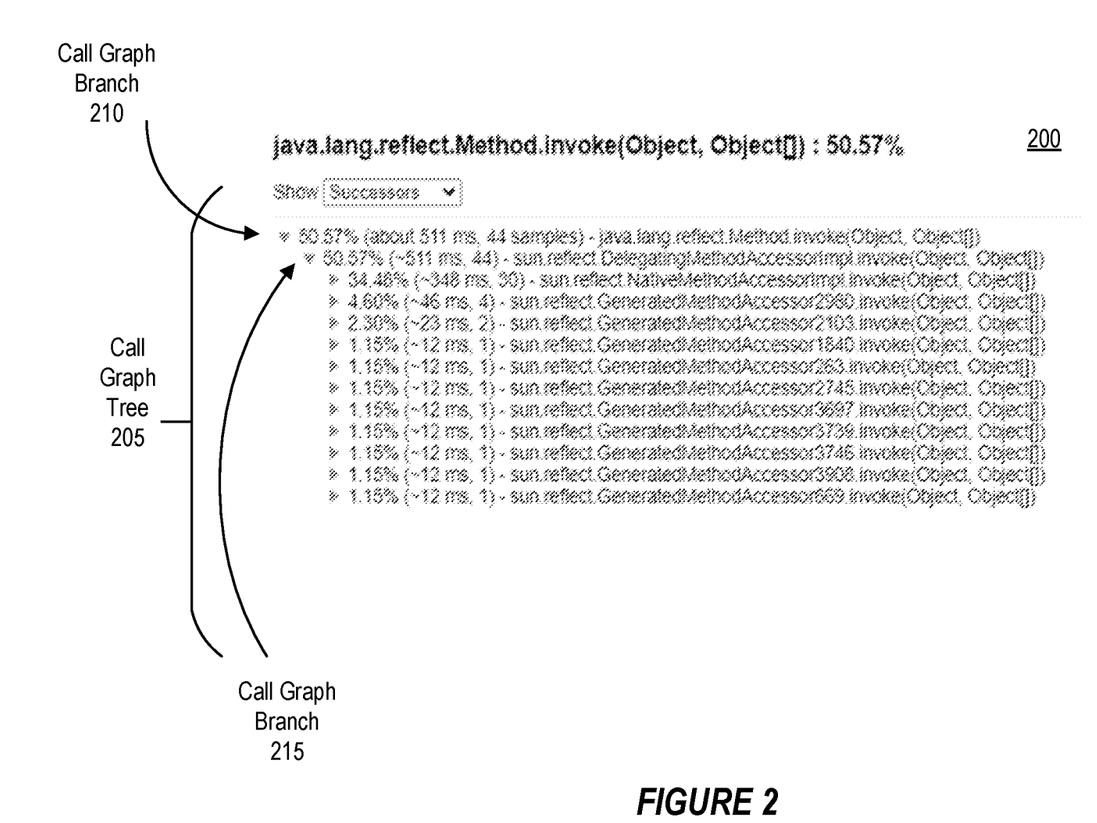
FIG. 2 shows an exemplary call graph, in accordance with an embodiment.

FIG. 2 shows an exemplary call graph, in accordance with an embodiment.

In accordance with an embodiment, FIG. 2 shows an exemplary call graph 200. Such a call graph can be generated, for example, by a software profiler that generates such a call graph when run on a software program or process. The call graph displayed in FIG. 2 is a call graph for a top level branch of the software program or process, called "java.lang.reflect.Method.invoke(Object, Object[ ])", which took 50.57% of the overall processing time of the software program or process.

In accordance with an embodiment, the call graph can comprise a call graph tree 205, which can comprise a number of call graph branches 210, 215. Such a call graph tree and call graph branches can represent non-leaf methods (methods in the branches of the call graphs which call other methods) of the method.

In accordance with an embodiment, as depicted in the embodiment shown in FIG. 2, the top-most method (java.lang.reflect.Method.invoke(Object, Object[ ])) calls a number of other methods. As shown, next to each method of the top most method is a parenthetical showing a time for execution as well as a number of samples discovered by the software profiler. As shown in the embodiment, the top most method took about 511 milliseconds to run, and had 44 samples. Importantly, this time as well as the number of samples includes the time and methods for the top most method to run, as well as all the branches of the top most method.

Figure 3:
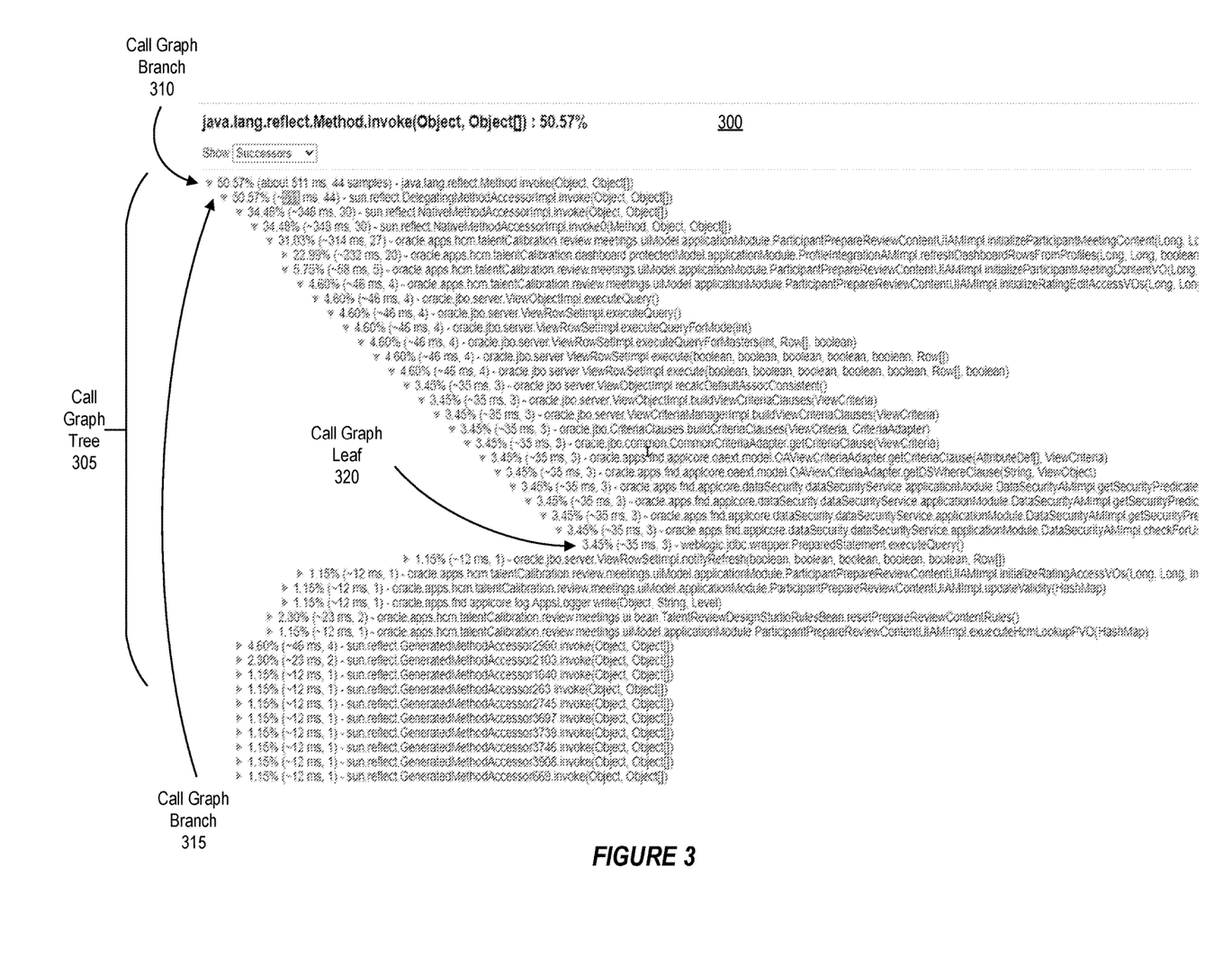
FIG. 3 shows an exemplary call graph, in accordance with an embodiment.

FIG. 3 shows an exemplary call graph, in accordance with an embodiment.

In accordance with an embodiment, FIG. 3 shows an exemplary call graph 300. Such a call graph can be generated, for example, by a software profiler that generates such a call graph when run on a software program or process. The call graph displayed in FIG. 3 is a call graph for a top level branch of the software program or process, called "java.lang.reflect.Method.invoke(Object, Object[ ])", which took 50.57% of the overall processing time of the software program or process.

In accordance with an embodiment, the call graph can comprise a call graph tree 305, which can comprise a number of call graph branches 310, 315. Such a call graph tree and call graph branches can represent non-leaf methods (methods in the branches of the call graphs and which do call other methods can comprise) of the method.

In accordance with an embodiment, the call graph tree can additionally include leaf methods, such as call graph leaf 320. Each leaf method within the generated call graph represents a method in a branch that does not call any other method.

In accordance with an embodiment, as depicted in the embodiment shown in FIG. 3, the top-most method (java.lang.reflect.Method.invoke(Object, Object[ ])) calls a number of other methods. As shown, next to each method of the top most method is a parenthetical showing a time for execution as well as a number of samples discovered by the software profiler. As shown in the embodiment, the top most method took about 511 milliseconds to run, and had 44 samples. Importantly, this time as well as the number of samples includes the time and methods for the top most method to run, as well as all the branches of the top most method.

Figure 4:
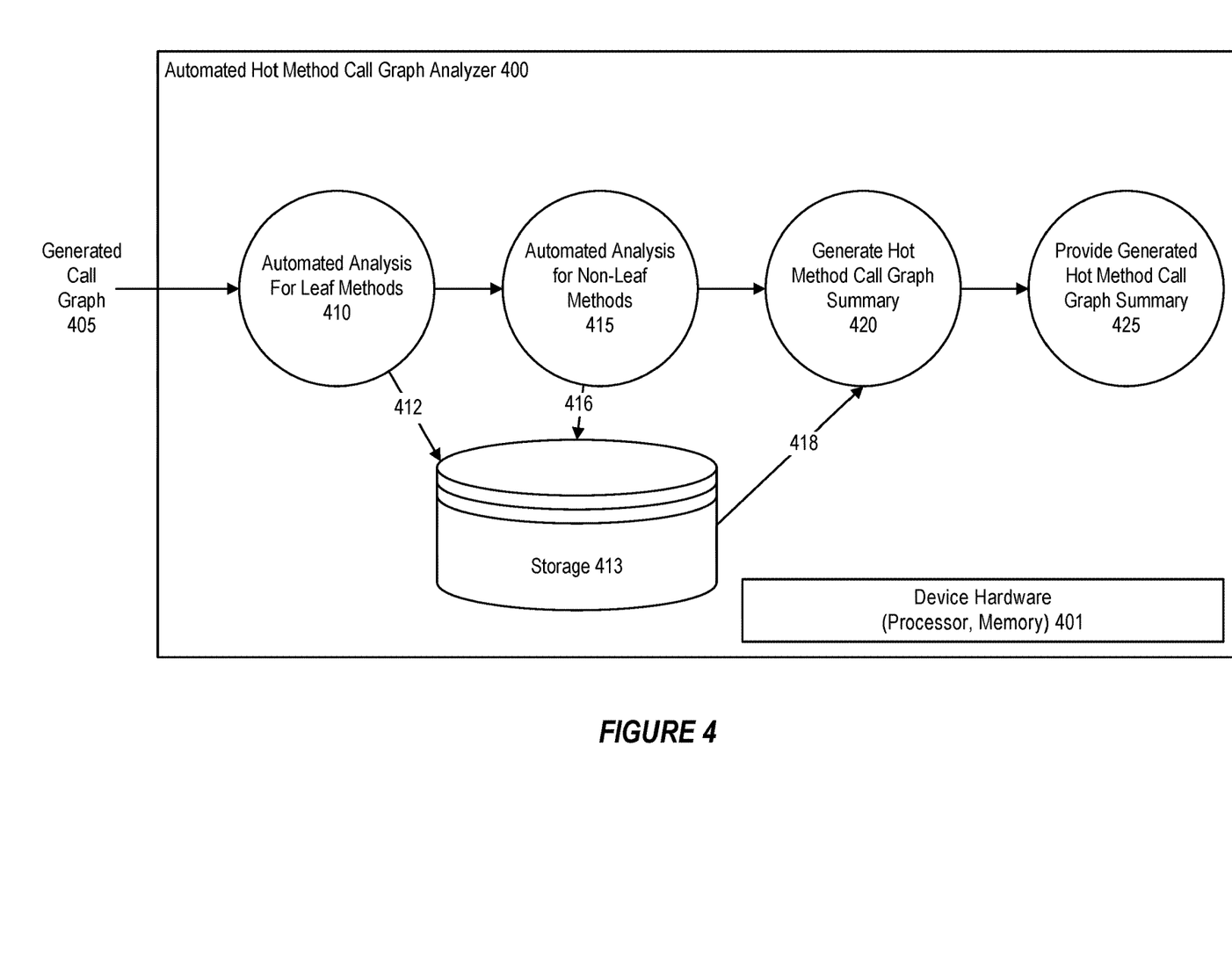
FIG. 4 is a system for hot method call graph analysis, in accordance with an embodiment.

FIG. 4 is a system for hot method call graph analysis, in accordance with an embodiment.

In accordance with an embodiment, at step 405, a generated call graph can be received at an automated hot method call graph analyzer 400, which can be run on a number of hardware and software resources 401. This generated call graph can comprise a call graph tree comprising one or more branches (i.e., top level methods and all levels of methods excepting leaf methods), as well as one or more leaves (leaf methods—methods having no dependent members).

In accordance with an embodiment, by way of example and not limitation, the automated hot method call graph analyzer 400 can be run, for example, as a standalone system, in cooperation additional systems, on the cloud, within a cloud infrastructure environment, or any other suitable system in which a generated call graph is received.

In accordance with an embodiment, at step 410, the system can perform an automated analysis for all leaf methods of the call graph tree. This can comprise traversing each branch of the call graph tree, maintaining a list of each leaf method of each branch, where the list comprises both the leaf method as well as each corresponding execution time and/or number of samples for each leaf method. For each list, the leaf methods are then sorted in decreasing order of execution time and/or number of samples. Finally, each list is then combined with each other list, sorted, and stored 412 at storage 413.

In accordance with an embodiment, at step 415, the system can perform an automated analysis for all non-leaf methods of the call graph tree. This can comprise traversing each branch of the call graph tree, maintaining a list of each non-leaf method of each branch, where the list comprises both the non-leaf method as well as each corresponding execution time and/or number of samples for each leaf method. Such non-leaf members that can be included in the hot method call graph analysis can comprise non-leaf members of the call graph tree that have their own, exclusive execution time or number of samples—that is, execution time or number of samples of a non-leaf member that cannot be attributable to the sum of all the execution times or number of samples of each child of the subject non-leaf member. For each list, the non-leaf methods are then sorted in decreasing order of execution time and/or number of samples. Finally, each list is then combined with each other list, sorted, and stored 416 at storage 413.

In accordance with an embodiment, at step 420, the analyzer can generate a hot method call graph summary by retrieving 418 and merging the list of each leaf method and each non-leaf method stored at steps 412 and 416. This summary is then sorted in decreasing order of execution times and/or number of samples.

In accordance with an embodiment, the generated hot method call graph summary can be provided 425, e.g., via a user-interface, such as a graphical user interface, and via normal file access.

Figure 5:
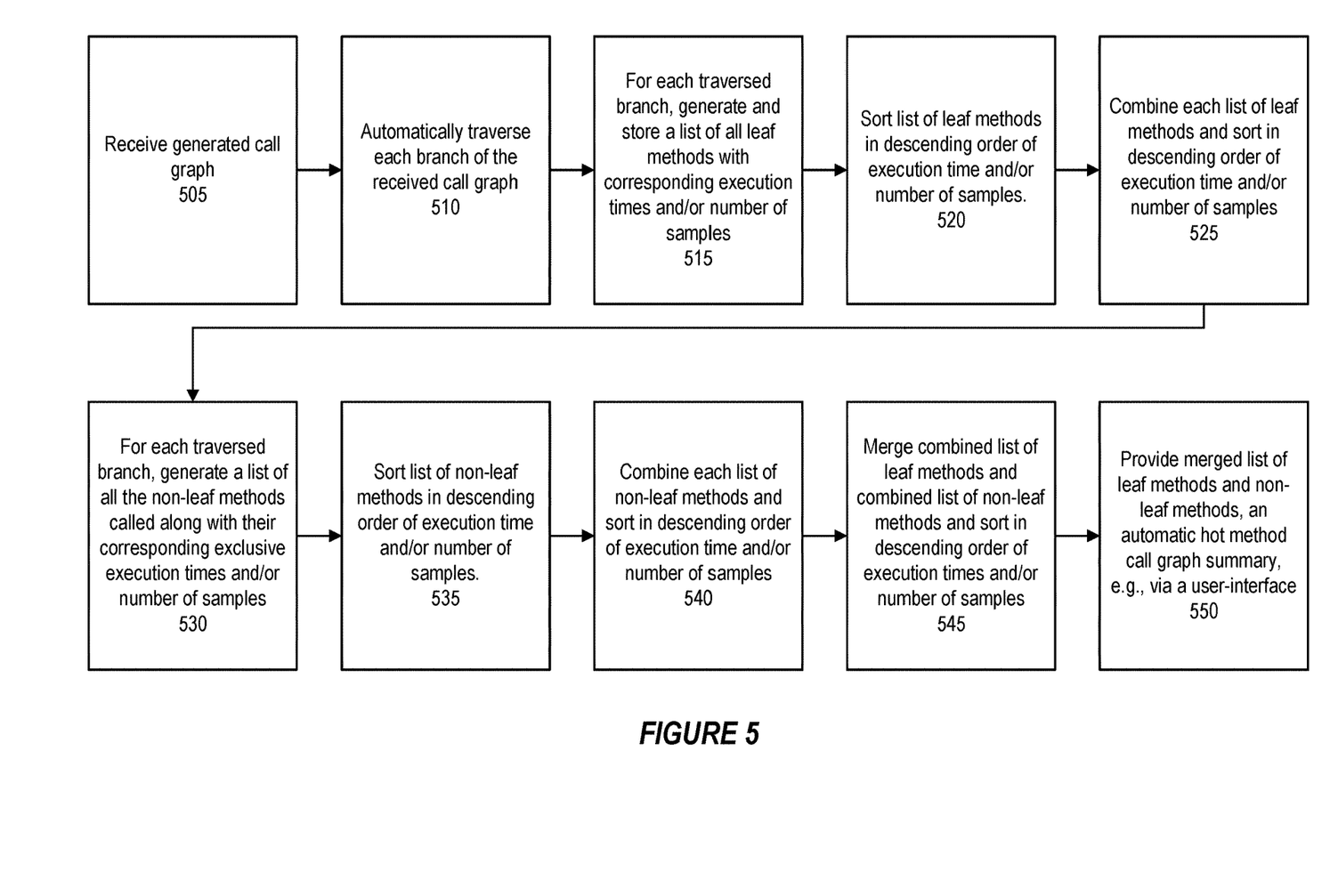
FIG. 5 is a flowchart of a method for hot method call graph analysis, in accordance with an embodiment.

FIG. 5 is a flowchart of a method for hot method call graph analysis, in accordance with an embodiment.

In accordance with an embodiment, at step 505, the method can receive a generated call graph comprising one or more top level branches, one or more intermediary branches, and one or more leaves. Each branch and leaf can correspond to a method of a program, system, or software from which the call graph was generated. Each leaf method within the generated call graph represents a method in a branch that does not call any other method. The generated call graph can comprise a representation of a hot method and can provide a corresponding execution time and/or number of samples.

In accordance with an embodiment, at step 510, the method can automatically traverse each branch of the received call graph.

In accordance with an embodiment, at step 515, the method can, for each traversed branch in the call graph, maintain a list of all the leaf methods called along with their corresponding exclusive execution times and/or number of samples. The leaf methods are methods in the branches of the call graphs which do not call any other methods.

In accordance with an embodiment, at step 520, the list of leaf hot methods for each traversed branch is sorted descending order of execution time and/or number of samples. Such lists, along with the corresponding execution times and/or number of samples for each leaf method, can be stored in an accessible memory.

In accordance with an embodiment, at step 525, the method can combine/merge all the obtained leaf hot methods lists into one single overall list of unique leaf hot methods along with their execution times and/or number of samples. The ordering of the combined list can remain such that each of the leaf methods are ordered according descending execution time and/or number of samples.

In accordance with an embodiment, at step 530, the method can, for each traversed branch in the call graph, maintain a list of all the non-leaf methods called along with their corresponding exclusive execution times and/or number of samples. The non-leaf methods are methods in the branches of the call graphs which do call other methods. Their exclusive execution times and/or number of samples can be obtained by subtracting the times and/or number of samples in their descendant methods they call from those of their own.

In accordance with an embodiment, at step 535, the list of non-leaf hot methods for each traversed branch is sorted descending order of execution time and/or number of samples. Such lists, along with the corresponding execution times and/or number of samples for each non-leaf method, can be stored in an accessible memory.

In accordance with an embodiment, at step 540, the method can combine/merge all the obtained non-leaf hot methods lists into one single overall list of unique non-leaf hot methods along with their execution times and/or number of samples. The ordering of the combined list can remain such that each of the non-leaf methods are ordered according descending execution time and/or number of samples.

In accordance with an embodiment, at step 545, the method can merge the combined list of leaf methods and combined list of non-leaf methods and sort in descending order of execution times and/or number of samples. A resultant list of such combination can be referred to as a hot method call graph summary.

In accordance with an embodiment, at step 550, the method can provide the hot method call graph summary, e.g., via a user-interface, such as a graphical user interface.

In accordance with an embodiment, the systems and methods described herein provide an advantage in automation of hot method call graph analysis. In addition, the systems and methods additionally provide for a storage advantage as the generated summary is often far smaller, in terms of storage size, than the call graph from which the summary was generated.

In accordance with an embodiment, in addition to performing the analysis down to each leaf method, the systems and methods perform the analysis down to each non-leaf method which itself utilizes samples. Such non-leaf methods are then represented in the analysis.

In accordance with an embodiment, it should be noted that while the sorting steps 520 and 535 are depicted and described as occurring prior to the merging at steps 525 and 540, one of ordinary skill in the art would readily understand and appreciate that the sorting could take place after the merging of the lists (both the leaf and non-leaf methods). In addition, the sorting could occur after the merging of the combined lists of leaf methods and non-leaf methods at step 545.

Figure 6:
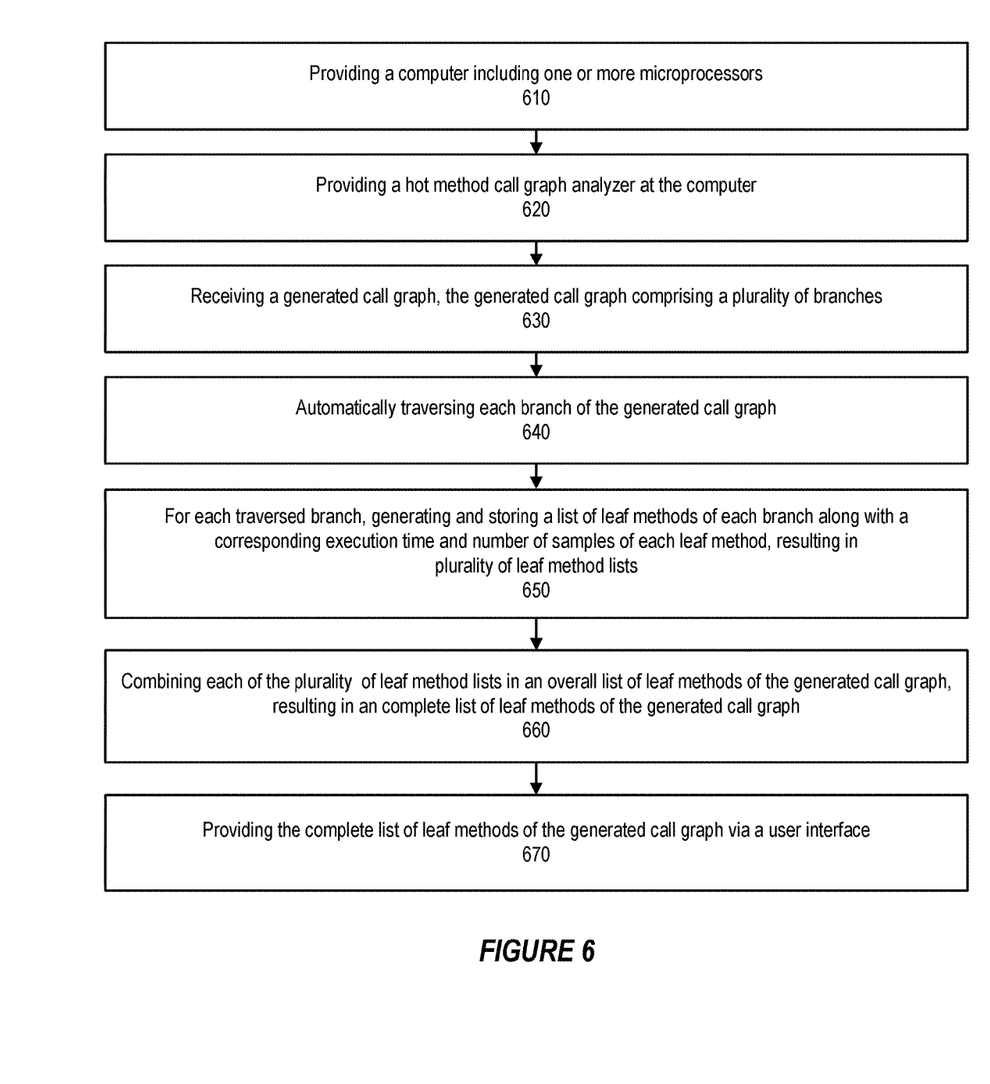
FIG. 6 is a flowchart of a method for hot method call graph analysis, in accordance with an embodiment.

FIG. 6 is a flowchart of a method for hot method call graph analysis, in accordance with an embodiment.

In accordance with an embodiment, at step 610, the method can provide a computer including one or more microprocessors.

In accordance with an embodiment, at step 620, the method can provide a hot method call graph analyzer at the computer.

In accordance with an embodiment, at step 630, the method can receive a generated call graph, the generated call graph comprising a plurality of branches.

In accordance with an embodiment, at step 640, the method can automatically traverse each branch of the generated call graph.

In accordance with an embodiment, at step 650, the method can, for each traversed branch, generate and store a list of leaf methods of each branch along with a corresponding execution time or a number of samples of each leaf method, resulting in plurality of leaf method lists.

In accordance with an embodiment, at step 660, the method can combine each of the plurality of leaf method lists in an overall list of leaf methods of the generated call graph, resulting in a complete list of leaf methods of the generated call graph.

In accordance with an embodiment, at step 670, the method can provide the complete list of leaf methods of the generated call graph via a user interface.

In some embodiments, features of the present invention are implemented, in whole or in part, in a computer including a processor, a storage medium such as a memory and a network card for communicating with other computers. In some embodiments, features of the invention are implemented in a distributed computing environment in which one or more clusters of computers is connected by a network such as a Local Area Network (LAN), switch fabric network (e.g. InfiniBand), or Wide Area Network (WAN). The distributed computing environment can have all computers at a single location or have clusters of computers at different remote geographic locations connected by a WAN.

In some embodiments, features of the present invention are implemented, in whole or in part, in the cloud as part of, or as a service of, a cloud computing system based on shared, elastic resources delivered to users in a self-service, metered manner using Web technologies. There are five characteristics of the cloud (as defined by the National Institute of Standards and Technology: on-demand self-service; broad network access; resource pooling; rapid elasticity; and measured service. Cloud deployment models include: Public, Private, and Hybrid. Cloud service models include Software as a Service (SaaS), Platform as a Service (PaaS), Database as a Service (DBaaS), and Infrastructure as a Service (IaaS). As used herein, the cloud is the combination of hardware, software, network, and web technologies which delivers shared elastic resources to users in a self-service, metered manner. Unless otherwise specified the cloud, as used herein, encompasses public cloud, private cloud, and hybrid cloud embodiments, and all cloud deployment models including, but not limited to, cloud SaaS, cloud DBaaS, cloud PaaS, and cloud IaaS.

In some embodiments, features of the present invention are implemented using, or with the assistance of hardware, software, firmware, or combinations thereof. In some embodiments, features of the present invention are implemented using a processor configured or programmed to execute one or more functions of the present invention. The processor is in some embodiments a single or multi-chip processor, a digital signal processor (DSP), a system on a chip (SOC), an application specific integrated circuit (ASIC), a field programmable gate array (FPGA) or other programmable logic device, state machine, discrete gate or transistor logic, discrete hardware components, or any combination thereof designed to perform the functions described herein. In some implementations, features of the present invention may be implemented by circuitry that is specific to a given function. In other implementations, the features may be implemented in a processor configured to perform particular functions using instructions stored e.g. on a computer readable storage media.

In some embodiments, features of the present invention are incorporated in software and/or firmware for controlling the hardware of a processing and/or networking system, and for enabling a processor and/or network to interact with other systems utilizing the features of the present invention. Such software or firmware may include, but is not limited to, application code, device drivers, operating systems, virtual machines, hypervisors, application programming interfaces, programming languages, and execution environments/containers. Appropriate software coding can readily be prepared by skilled programmers based on the teachings of the present disclosure, as will be apparent to those skilled in the software art.

In some embodiments, the present invention includes a computer program product which is a storage medium or computer-readable medium (media) having instructions stored thereon/in, which instructions can be used to program or otherwise configure a system such as a computer to perform any of the processes or functions of the present invention. The storage medium or computer readable medium can include, but is not limited to, any type of disk including floppy disks, optical discs, DVD, CD-ROMs, microdrive, and magneto-optical disks, ROMs, RAMs, EPROMs, EEPROMs, DRAMs, VRAMs, flash memory devices, magnetic or optical cards, nanosystems (including molecular memory ICs), or any type of media or device suitable for storing instructions and/or data. In particular embodiments, the storage medium or computer readable medium is a non-transitory storage medium or non-transitory computer readable medium.

The foregoing description is not intended to be exhaustive or to limit the invention to the precise forms disclosed. Additionally, where embodiments of the present invention have been described using a particular series of transactions and steps, it should be apparent to those skilled in the art that the scope of the present invention is not limited to the described series of transactions and steps. Further, where embodiments of the present invention have been described using a particular combination of hardware and software, it should be recognized that other combinations of hardware and software are also within the scope of the present invention. Further, while the various embodiments describe particular combinations of features of the invention it should be understood that different combinations of the features will be apparent to persons skilled in the relevant art as within the scope of the invention such that features of one embodiment may be incorporated into another embodiment. Moreover, it will be apparent to persons skilled in the relevant art that various additions, subtractions, deletions, variations, and other modifications and changes in form, detail, implementation and application can be made therein without departing from the spirit and scope of the invention. It is intended that the broader spirit and scope of the invention be defined by the following claims and their equivalents.

What is claimed is:

1. A system for hot method call graph analysis, comprising:
- a computer including one or more microprocessors;
- a hot method call graph analyzer provided at the computer, wherein the hot method call graph analyzer:
  - receives a generated call graph, the generated call graph comprising a plurality of branches;
  - automatically traverses each branch of the generated call graph;
  - for each traversed branch, generates and stores a list of leaf methods of each branch along with a corresponding execution time or a number of samples of each leaf method, resulting in a plurality of leaf method lists;
  - combines each of the plurality of leaf method lists in an overall list of leaf methods of the generated call graph, resulting in a complete list of leaf methods of the generated call graph;
  - provides the complete list of leaf methods of the generated call graph via a user interface;
  - for each traversed branch, generates and stores a list of non-leaf methods of each branch along with a corresponding execution time and number of samples of each non-leaf method, resulting in a plurality of non-leaf method lists, wherein each non-leaf method within the plurality of non-leaf method lists comprises a distinct execution time or a number of samples;
  - combines each of the plurality lists of non-leaf methods in an overall list of non-leaf methods of the generated call graph, resulting in a complete list of non-leaf methods of the generated call graph; and
  - provides the complete list of non-leaf methods of the generated call graph via the user interface.

2. The system of claim 1, wherein the hot method call graph analyzer generates and stores the list of leaf methods of each branch along with both the corresponding execution time and the number of samples of each leaf method.

3. The system of claim 1, wherein the hot method call graph analyzer sorts each of the plurality of lists of leaf methods in decreasing order of execution time of each leaf method within each corresponding list; and
  - wherein the complete list of leaf methods of the generated call graph is sorted in decreasing order of execution time of each leaf method.

4. The system of claim 1, wherein the hot method call graph analyzer sorts each of the plurality of lists of leaf methods in decreasing order of number of samples of each leaf method within each corresponding list.

5. The system of claim 4, wherein the complete list of leaf methods of the generated call graph is sorted in decreasing order of number of samples of each leaf method.

6. The system of claim 1, wherein the hot method call graph analyzer merges the complete list of leaf methods of the generated call graph and the complete list of non-leaf methods of the generated call graph in a hot method call graph summary and provides the hot method call graph summary via the user interface.

7. A method for hot method call graph analysis, comprising:
- providing a computer including one or more microprocessors;
- providing a hot method call graph analyzer at the computer;
- receiving a generated call graph, the generated call graph comprising a plurality of branches;
- automatically traversing each branch of the generated call graph;
- for each traversed branch, generating and storing a list of leaf methods of each branch along with a corresponding execution time or a number of samples of each leaf method, resulting in a plurality of leaf method lists;
- combining each of the plurality of leaf method lists methods in an overall list of leaf methods of the generated call graph, resulting in a complete list of leaf methods of the generated call graph;
- providing the complete list of leaf methods of the generated call graph via a user interface;
- for each traversed branch, generating and storing a list of non-leaf methods of each branch along with a corresponding execution time and number of samples of each non-leaf method, resulting in a plurality of non-leaf method lists, wherein each non-leaf method within the plurality of non-leaf method lists comprises a distinct execution time and number of samples;
- combining each of the plurality lists of non-leaf methods in an overall list of non-leaf methods of the generated call graph, resulting in a complete list of non-leaf methods of the generated call graph; and
- providing the complete list of non-leaf methods of the generated call graph via the user interface.

8. The method of claim 7, wherein the hot method call graph analyzer generates and stores the list of leaf methods of each branch along with both the corresponding execution time and the number of samples of each leaf method.

9. The method of claim 7, wherein the hot method call graph analyzer sorts each of the plurality of lists of leaf methods in decreasing order of execution time of each leaf method within each corresponding list; and
  - wherein the complete list of leaf methods of the generated call graph is sorted in decreasing order of execution time of each leaf method.

10. The method of claim 7, wherein the hot method call graph analyzer sorts each of the plurality of lists of leaf methods in decreasing order of number of samples of each leaf method within each corresponding list.

11. The method of claim 10, wherein the complete list of leaf methods of the generated call graph is sorted in decreasing order of number of samples of each leaf method.

12. The method of claim 7, wherein the hot method call graph analyzer merges the complete list of leaf methods of the generated call graph and the complete list of non-leaf methods of the generated call graph in a hot method call graph summary and provides the hot method call graph summary via the user interface.

13. A non-transitory computer readable storage medium, having instructions for hot method call graph analysis, which when read and executed cause a computer to perform steps comprising:
- providing a computer including one or more microprocessors;
- providing a hot method call graph analyzer at the computer;
- receiving a generated call graph, the generated call graph comprising a plurality of branches;
- automatically traversing each branch of the generated call graph;
- for each traversed branch, generating and storing a list of leaf methods of each branch along with a corresponding execution time or a number of samples of each leaf method, resulting in a plurality of leaf method lists;
- combining each of the plurality of leaf method lists methods in an overall list of leaf methods of the generated call graph, resulting in a complete list of leaf methods of the generated call graph;

providing the complete list of leaf methods of the generated call graph via a user interface;

for each traversed branch, generating and storing a list of non-leaf methods of each branch along with a corresponding execution time and number of samples of each non-leaf method, resulting in a plurality of non-leaf method lists, wherein each non-leaf method within the plurality of non-leaf method lists comprises a distinct execution time and number of samples;

combining each of the plurality lists of non-leaf methods in an overall list of non-leaf methods of the generated call graph, resulting in a complete list of non-leaf methods of the generated call graph; and providing the complete list of non-leaf methods of the generated call graph via the user interface.

14. The non-transitory computer readable storage medium of claim 13, wherein the hot method call graph analyzer generates and stores the list of leaf methods of each branch along with both the corresponding execution time and the number of samples of each leaf method.

15. The non-transitory computer readable storage medium of claim 13, wherein the hot method call graph analyzer sorts each of the plurality of lists of leaf methods in decreasing order of execution time of each leaf method within each corresponding list; and wherein the complete list of leaf methods of the generated call graph is sorted in decreasing order of execution time of each leaf method.

16. The non-transitory computer readable storage medium of claim 13, wherein the hot method call graph analyzer sorts each of the plurality of lists of leaf methods in decreasing order of number of samples of each leaf method within each corresponding list.

17. The non-transitory computer readable storage medium of claim 16, wherein the complete list of leaf methods of the generated call graph is sorted in decreasing order of number of samples of each leaf method.

18. The non-transitory computer readable storage medium of claim 13, wherein the hot method call graph analyzer merges the complete list of leaf methods of the generated call graph and the complete list of non-leaf methods of the generated call graph in a hot method call graph summary and provides the hot method call graph summary via the user interface.

* * * * *